Figure 1:
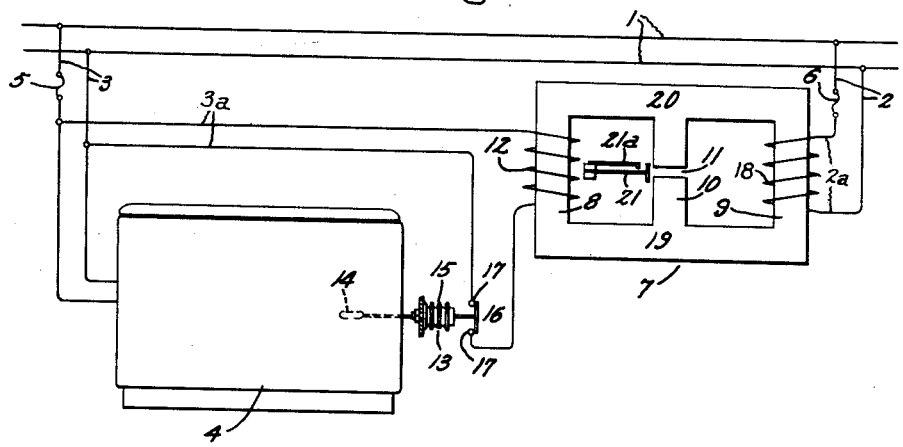

Nov. 11, 1952    S. B. WELCH    2,617,867
ALARM FOR POWER FAILURE
Filed Dec. 24, 1949

Inventor:
Stanley B. Welch,
by William G. Edwards, Jr.
His Attorney.

Patented Nov. 11, 1952

2,617,867

UNITED STATES PATENT OFFICE 2,617,867

ALARM FOR POWER FAILURE

Stanley B. Welch, Milford, Conn., assignor to General Electric Company, a corporation of New York Application December 24, 1949, Serial No. 134,985

3 Claims. (Cl. 177—311)

This invention relates to alarm systems and, in particular, to a device for audibly signaling a change in predetermined conditions within a home freezer or frozen food storage chest.

Cabinets for storing frozen food must be maintained at a low temperature in order to safely store food over a prolonged period. One of the dangers in storing food in such a cabinet is that a power failure might occur which will eventually cause a rise in the temperature of the storage compartment of the cabinet to the point where stored food will spoil.

It is to be pointed out particularly that the alarm system, which is the principal feature of this invention, depends upon there being at least one operating circuit within the house and that power failure exists only in the circuit feeding the frozen food cabinet or the alarm control circuits. If there is a complete power failure in the house, it will be readily noticeable from features such as stopped clocks or lack of light. If the power failure is in the frozen food unit itself, however, since this could be caused by a blown fuse or an open thermostat, it might not be immediately determined and, consequently, the alarm will have a high degree of utility in indicating immediately the open circuit to the frozen food unit.

In addition, an increase in the temperature within the cabinet may occur through failure of the refrigerating apparatus to operate properly, leaving of the cover partially open, etc., and this increase in temperature is indicated by a thermostat and, ultimately, by the audible signal device.

It is an object of this invention to provide an improved audible signal alarm for indicating a power failure or a change in a predetermined condition in an electrical device.

It is a further object of this invention to provide a device for creating an audible signal upon the occurrence of a power failure in the line or circuit that energizes the refrigerating apparatus of a freezer, or in the circuit that energizes the alarm directly, or upon the occurrence of an abnormally high temperature in the storage compartment of the freezer.

It is a still further object of this invention to provide a device for signaling a power failure in a freezer that will be simple in operation and which will not require excessive power to operate it.

Broadly, this invention comprises the use of a three-legged magnetic structure or reactor having an air gap in the center leg. The two outer legs are each provided with a winding in series with separate electric branch circuits. If a power failure exists in either circuit, then an audible signal is created to warn that the freezer or other apparatus is not operating properly, or that the alarm system is not properly energized.

These, and other objects and advantages of this invention, will become apparent and will be more clearly understood from the following description referring to the accompanying drawing, and the features of novelty which characterize this invention will be pointed out with particularity in the claims annexed to and forming a part of this specification.

Figure 2:
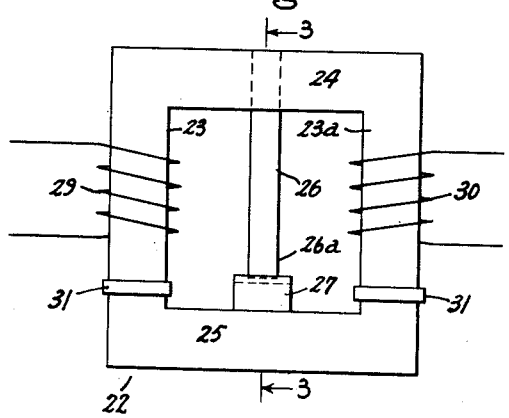
Figure 3:
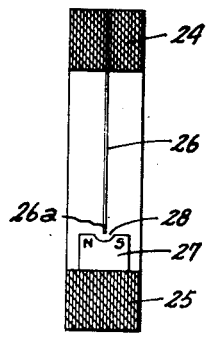

Referring to the drawing, Fig. 1 is a schematic representation of the improved audible signal device connected to a frozen food unit circuit; Fig. 2 is a front view of a modification of the improved audible signaling device; while Fig. 3 is a view, partially in section, taken on the line 3—3 of Fig. 2 looking in the direction of the arrows.

In the drawing, an A.-C. power supply 1 is shown in Fig. 1 having branch circuits 2 and 3. A frozen food cabinet or home freezer 4 is shown connected directly to branch circuit 3, which, in turn, is connected to the power supply 1 through fuse 5, and to a control circuit 3a. Branch circuit 2 is shown connected to power supply 1 through fuse 6, and to a control circuit 2a.

A reactor 7 is shown having legs 8, 9 and 10 with an air gap 11 in center leg 10. A winding or coil 12 is shown wound on leg 8 of the reactor. Coil 12 is in control circuit 3a directly across the line of branch circuit 3 with fuse 5 between control circuit 3a and power supply 1.

A thermostat 13 is indicated as being connected to the frozen food cabinet 4 with a temperature responsive element 14 within the home freezer that regulates the expansion of a bellows 15. The expansion and contraction of bellows 15 operates a switch 16 having terminals 17. Switch 16 of thermostat 13 is in series with the circuit that controls the flow of current to coil 12 on leg 8 of reactor 7. Consequently, if, for some reason such as the lid of the home freezer being left partially ajar or the failure of the refrigerating apparatus to operate properly, the temperature of the frozen food unit rises to an unsafe level, switch 16 opens contacts 17 and breaks the circuit to coil 12.

A winding or coil 18 is shown in control circuit 2a encircling leg 9 of reactor 7 and connected to power supply 1 through branch circuit 2 and fuse 6.

When both coils 12 and 18 are energized, a magnetomotive force is set up and flux flows through the iron core of reactor 7. Specifically, at any one instant, the flux from coil 12 flows from leg 8 through bottom section 19 of reactor 7 and divides with the majority of the flux flowing toward leg 9 and a small part of the flux flowing through the high reluctance path in leg 10. The high reluctance naturally is caused by the air gap 11 in leg 10. At the same instant, or during the same half cycle, the magnetomotive force produced by coil 18 causes a flux to flow through top section 20 of reactor 7, where it divides with a majority of the flux flowing toward leg 8 and with a smaller portion of the flux flowing into leg 10, due to the high reluctance caused by air gap 11.

It is to be noted that the flux produced by the two coils is additive in the outer ring of the reactor, that is, through leg 8, bottom portion 19, leg 9 and top portion 20 of reactor 7. In leg 10 of the reactor, however, the flux produced by coil 18 opposes and balances-out the flux produced by coil 12 and, consequently, there is no magnetomotive force available to cause a flow of flux across the air gap 11, so long as both coil 12 and coil 18 are energized and have the same ampere-turn rating.

If the circuit to coil 12 is opened, however, by a burned-out fuse 5 or by an open switch 16, then there is no opposing force through leg 10 to balance the magnetomotive force produced by coil 18. Consequently, a flux flows across gap 11 in leg 10 of the reactor. Conversely, if the circuit to coil 18 is open while coil 12 is energized, a flux will again flow across gap 11 in leg 10 of the reactor. This flux operates the vibrating reed 21 to sound an audible alarm warning that the control circuit of the alarm device has been interrupted.

Vibrating reed 21 is arranged to follow the flux impulses across air gap 11 in leg 10. In every complete cycle of current flow through coil 18, the current reverses; it flows in one direction, then in the opposite direction, producing a flux across air gap 11 that likewise reverses itself. Since reed 21 is arranged to follow the flow of flux, it sets up a vibration which is increased by a sounding board 21a to the point where an audible signal is created when only one coil is energized. This audible signal warns that there has been an interruption of current flow to the frozen food cabinet 4, that the temperature within the cabinet has risen above a predetermined maximum, or that the alarm is not functioning properly (i. e. if coil 18 is not energized while coil 12 is).

An alternative arrangement of this invention is shown in Figs. 2 and 3 of the drawing; specifically, a loop magnetic structure or reactor 22 is provided with legs 23 and 23a which are joined by a top portion 24 and a bottom portion 25. In the center of the loop reactor, a vibrating reed 26 is installed substantially parallel to legs 23 and 23a. The vibrating reed 26 is in essence a third leg similar to the center leg 10 in Fig. 1. It could, of course, be replaced by such a leg 10 having a shorter reed secured thereto, or the reed 26 could be relatively rigid except for the lower end thereof which would be adapted for vibrating. A permanent magnet 27 is provided on the bottom portion 25 of reactor 22. The magnet is so located that the end 26a of vibrating reed 26 rests between the poles of the permanent magnet 27. In this manner, an air gap 28 is provided which is somewhat the equivalent of the air gap 11 shown in leg 10 of reactor 7.

A winding or coil 29 is placed on leg 23 and a winding or coil 30 is placed on leg 23a. Winding 29 corresponds with winding 12 on leg 8 of reactor 7, while winding 30 corresponds with winding 18 on leg 9 of reactor 7. This arrangement functions essentially the same as that shown in Fig. 1. Specifically, windings 29 and 30 are so arranged that the flux produced by these windings when they are both energized tends to flow in the same direction around the outer loop of the transformer. In the center leg, however, the situation is exactly as that described for leg 10 of transformer 7; that is, the flux produced by coil 30 that enters vibrating reed 26 is opposed by the flux produced by coil 29. Consequently, when both coils are energized, there is no magnetomotive force produced by the coils across air gap 28 between vibrating reed 26 and permanent magnet 27. Flux does not flow across this air gap and the vibrating reed is stationary.

If coil 29 is de-energized, however, then the flux produced by coil 30 produces a magnetomotive force across the air gap 28 and causes the vibrating reed to move.

Permanent magnet 27 materially assists in setting up vibration in reed 26. On one-half of a cycle, the flux from winding 30 is aided by one pole and opposed by the other pole of permanent magnet 27. As a result, the reed moves to the stronger pole. The reverse is true on the opposite half-cycle.

The legs 23 and 23a are provided with short circuit windings 31 and 31a respectively. The short circuit windings are intended, in effect, to increase the reluctance of the outer legs. This causes a larger percentage of the flux to flow in the center leg, aiding in the vibration of reed 26. With the addition of the short circuit windings on the outer legs, the flux required to operate the vibrating reed can be produced with less power input to coils 29 and 30. This results in a cheaper operating cost for the signaling device.

Modifications of this invention will occur to those skilled in the art and it is desired to be understood, therefore, that this invention is not limited to the particular arrangement disclosed but that the appended claims are meant to cover all modifications which are within the spirit and scope of this invention.

What I claim as new and desire to secure by Letters Patent of the United States is:

1. An alarm comprising a reactor having two outer parallel legs and a central leg provided with an air gap, a power supply provided with two branch circuits, one of said branch circuits energizing a first control circuit including a winding about one of the outer legs of said reactor, means responsive to a predetermined condition for interrupting said first control circuit, the other of said branch circuits energizing a second control circuit including a winding about the other outer leg of said reactor, and a vibrating reed operatively responsive to flux lines across said air gap, each of said windings being so poled as to set up magnetic fluxes that oppose one another at said air gap, whereby said resultant magnetic lines of force increase when either of said control circuits is interrupted to vibrate said reed to produce an audible signal.

2. In an alarm for a home freezer, a closed magnetic structure comprising two outer parallel legs and a central leg provided with an air gap, a first winding on one of said outer legs, a second winding on the other of said outer legs, a switch and a temperature responsive means within the home freezer adapted to open said switch, a power supply provided with two branch circuits, one of said branch circuits energizing said home freezer and a first control circuit including said switch and said first winding, the other of said branch circuits energizing a second control circuit including said second winding, said windings when energized setting up magnetic fluxes in said magnetic structure that oppose one another at said air gap, and means positioned at said air gap responsive to the interruption of either of said control circuits for producing an audible signal.

3. An alarm for audibly signaling an interruption in the power supply to a home freezer, said alarm comprising a closed magnetic structure having two outer parallel legs of soft iron and a third leg between the first two of said legs, a first winding on one of said outer legs, a second winding on the other of said outer legs, said third leg being of spring-like steel rigidly secured at one of its ends to form a vibrating reed, a permanent magnet secured to said magnetic structure and positioned below the free end of said vibrating reed providing an air gap therebetween, a household power supply including two branch circuits, one of said branch circuits energizing the home freezer and a first control circuit including said first winding, and a second branch circuit energizing a second control circuit including said second winding, the magnetic flux of said permanent magnet adding to the magnetic flux produced by either of said windings to cause said vibrating reed to produce an audible signal, the magnetic flux produced by each of said coils normally opposing and balancing one another at said air gap to prevent vibration of said reed, whereby an audible signal is produced only when there is an interruption in either of said branch circuits.

STANLEY B. WELCH.

REFERENCES CITED

The following references are of record in the file of this patent:

UNITED STATES PATENTS

| Number | Name | Date |
|---|---|---|
| 652,734 | Coleman | June 26, 1900 |
| 2,439,331 | Bean | Apr. 6, 1948 |
| 2,561,366 | Hart | July 24, 1951 |
| 2,582,790 | Newell | Jan. 15, 1952 |

FOREIGN PATENTS

| Number | Country | Date |
|---|---|---|
| 234,592 | Great Britain | June 4, 1925 |
| 253,545 | Great Britain | Dec. 16, 1926 |